United States Patent [19]
McCormick

[11] Patent Number: 6,027,580
[45] Date of Patent: Feb. 22, 2000

[54] HYDROPHILICIZING POST-TREATMENT OVER CHROMATE CONVERSION COATING

[75] Inventor: David R. McCormick, Clawson, Mich.

[73] Assignee: Henkel Corporation, Gulph Mills, Pa.

[21] Appl. No.: 09/091,124

[22] PCT Filed: Dec. 4, 1996

[86] PCT No.: PCT/US96/19135

§ 371 Date: Jun. 15, 1998

§ 102(e) Date: Jun. 15, 1998

[87] PCT Pub. No.: WO97/21780

PCT Pub. Date: Jun. 19, 1997

Related U.S. Application Data

[60] Provisional application No. 60/008,761, Dec. 13, 1995.

[51] Int. Cl.[7] .......................................................... C23F 7/12
[52] U.S. Cl. ............................ 148/265; 148/261; 148/272
[58] Field of Search ..................................... 148/265, 261,
148/262, 272; 106/14.12, 14.15, 14.44;
252/389.2, 389.54

[56] References Cited

U.S. PATENT DOCUMENTS

| | | | |
|---|---|---|---|
| 3,097,978 | 7/1963 | Newell et al. .......................... | 148/262 |
| 4,110,129 | 8/1978 | Matsushima et al. .................. | 148/262 |
| 4,146,410 | 3/1979 | Reinhold ................................. | 148/6.2 |
| 4,797,183 | 1/1989 | Yamamoto et al. ...................... | 204/16 |
| 5,350,791 | 9/1994 | Hsu ........................................ | 148/265 |

*Primary Examiner*—Prince Willis
*Assistant Examiner*—Andrew L. Oltmans
*Attorney, Agent, or Firm*—Ernest G. Szoke; Wayne C. Jaeschke; Norvell E. Wisdom, Jr.

[57] ABSTRACT

Substantially improved hydrophilicity can be provided to a metal substrate, particularly an aluminum alloy of the type used for heat exchanger fins, that has been previously provided with a conventional chromium oxide conversion coating, by drying into place on the surface of the chromium oxide conversion coating an aqueous liquid hydrophilicizing treatment composition containing at least one of: (i) a product or products of reaction between dissolved phosphoric acid and at least one of elemental metal, metal oxides, and metal hydroxides in contact therewith; (ii) tungstate ions; and (iii) at least one of sulfate or molybdate ions together with polyethyleneimine. Most preferably, a solution formed by dissolving MgO in aqueous $H_3PO_4$ in the proper stoichiometric amount to form an aqueous solution of $Mg(H_2PO_4)_2$ with a pH of 4.5–5.5 is used for the hydrophilicizing treatment.

20 Claims, No Drawings

6,027,580

HYDROPHILICIZING POST-TREATMENT OVER CHROMATE CONVERSION COATING

CROSS-REFERENCE TO RELATED APPLICATION

Priority for this application is claimed under 35 U.S.C. § 119(e) from application Ser. No. 60/008761 filed Dec. 13, 1995.

BACKGROUND OF THE INVENTION

1. Field of the Invention

This invention relates to a hydrophilicizing treatment for a chromate conversion coating over underlying metal, particularly aluminum or an aluminum alloy containing at least 75% of aluminum. After treatment of a surface according to this invention, water will have a tendency to spread spontaneously over the surface. The invention is particularly advantageously applicable to provide aluminum evaporators, heat exchangers, and condensers, especially those used for automobile air conditioning, with hydrophilic coatings that have good corrosion resistance and a durably hydrophilic character with little or no tendency to develop undesirable odors during use.

2. Statement of Related Art

Although any of the common structural metals can be used in constructing practical heat exchanging surfaces, aluminum and its alloys are among those most often used, because of their high heat conductivity. In heat exchanger surfaces, metals are normally used without any relatively thick protective coating such as a paint or lacquer that would normally be used to improve the resistance of the metals to corrosion in most other types of metal structures, but is avoided in heat exchangers because such a coating would also reduce the efficiency of heat exchange.

During the cooling of hot air, a common use of these heat exchangers, moisture contained as vapor in the hot air condenses and initially forms water drops or beads on the fins of the heat exchanger. If the surface of the heat exchanger fins is not sufficiently hydrophilic, the water beads accumulate on the fin surface and impede the air flow between fins and also reduce the heat transfer efficiency. The condensed water beads also tend to absorb dust and contaminants in the air, such as carbon dioxide, nitrogen oxides, and sulfur oxides, which can promote corrosion of the underlying aluminum. Therefore, the formation of water beads on the fins of aluminum heat exchanger not only decreases heat transfer efficiency but also can physically damage the exchanger.

In order to achieve a desirable combination of a hydrophilic nature and corrosion resistance on metal, particularly aluminum, surfaces, various coatings and treatments have been tried, but no fully satisfactory result has yet been achieved. A chromate conversion coating without any post-treatment usually has inadequate corrosion resistance and often develops an unpleasant odor. Silicate coating over a chromate conversion coat has often been used but has not satisfied all users. More recently, biocide protected hydrophilic organic polymer films have been used as post-treatments over chromate conversion coatings. While effective, these have proved to be expensive and difficult to control in some commercial operations.

DESCRIPTION OF THE INVENTION

Object of the Invention

The principal object of the invention is to provide metal heat exchanger surfaces with adequate hydrophilicity and corrosion resistance, while avoiding or at least mitigating at least one of the following problems sometimes observed with prior art hydrophilicizing treatments: dissolution of environmentally undesirable hexavalent chromium from the underlying chromate coating; dust in the passenger compartment of automobiles equipped with air conditioners bearing a prior art coating on its heat exchangers; unpleasant odors in the vicinity of the heat exchanger surface when operating; a need for expensive materials to form the hydrophilic surface; and complicated maintenance requirements for the process of forming the hydrophilic coating. Other objects will be apparent from the description below.

General Principles of Description

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counter-ions to produce electrical neutrality for the composition as a whole; any counterions thus implicitly specified should preferably be selected from among other constituents explicitly specified in ionic form, to the extent possible; otherwise such counterions may be freely selected, except for avoiding counterions that act adversely to the objects of the invention; the terms "molecule" and "mole" and their grammatical variations may be applied to ionic, elemental, or any other type of chemical entities defined by the number of atoms of each type present therein, as well as to substances with well-defined neutral molecules; the first definition of an acronym or other abbreviation applies to all subsequent uses herein of the same abbreviation; and the term "polymer" includes "oligomer", "homopolymer", "copolymer", "terpolymer", and the like.

SUMMARY OF THE INVENTION

It has been found that a desirable combination of hydrophilicity and corrosion resistance can be achieved on the surface of metals, particularly aluminum and its alloys containing at least 75% by weight aluminum, by first providing the metal surface with a conventional chromium oxide conversion coating, and then, preferably very soon after forming the conversion coating, post-treating the surface with at least one of (i) a solution having a composition which could be achieved, and which preferably actually is made, by dissolving elemental metal, metal oxides, and/or metal hydroxides in aqueous phosphoric acid, (ii) an aqueous solution containing tungstate ions, and (iii) an aqueous solution containing sulfate or molybdate ions together with polyethyleneimine.

One embodiment of the invention is a composition suitable for direct use in imparting hydrophilicity to a chromated metal surface; such a composition may be described hereinafter as a "working composition". Another embodiment of the invention is a concentrate composition, which can be diluted with water to produce a working composition as specified above. Still another embodiment of the invention is a process of treating a chromated metal surface as described above.

DETAILED DESCRIPTION OF THE INVENTION AND PREFERRED EMBODIMENTS

The preferred aqueous treatment compositions of the invention, which contain phosphoric acid at least as a starting material, may utilize any of the phosphoric acids in which phosphorus is in its +5 oxidation state, i.e., metaphosphoric acid ($HPO_3$), orthophosphoric acid ($H_3PO_4$), pyrophosphoric acid ($H_4P_2O_7$), or any of the higher condensed phosphoric acids with the general formula $H_{(n+2)}P_nO_{(3n+1)}$, where n represents a positive integer with a value of at least three. It is generally believed that all these acids are in equilibrium with one another in aqueous solutions, with orthophosphoric acid being much the most predominant at low concentrations and temperatures and the more condensed acids (including metaphosphoric acid) becoming important only at high concentrations and temperatures, or when their salts are present in the aqueous solutions along with acid. At least partly for reasons of economy, orthophosphoric acid is generally preferred for use in this invention.

Aqueous solutions of any salts of phosphoric acid(s) can be used as post-treatments according to the invention, but, at least for the preferred salts, it is preferable to utilize aqueous treatment compositions prepared by dissolving metal oxides and/or hydroxides in aqueous phosphoric acid solutions rather than solutions of the salts themselves. The preferred treatment solutions are described in this way because it is often possible to obtain transparent and otherwise apparently stable solutions by dissolving metal oxides and/or hydroxides in aqueous phosphoric acid, even though these apparent solutions are "supersaturated" with respect to the phosphate and/or mono- or di-acid phosphate salt or salts to which their phosphoric acid and metal contents nominally correspond. Although the invention is not to be considered to be limited by any theory, it is believed that these "supersaturated" solutions may contain coordination compounds or other chemical species of unknown structure that are at least part of the reason for their hydrophilicizing properties.

Preferably the metal oxides codissolved with phosphoric acid in the aqueous liquid post-treatment compositions used according to the invention are oxides of metals with a valence of at least two, more preferably exactly two. The single most preferred metal is magnesium.

When the oxide or hydroxide of one or more divalent metals is used with orthophosphoric acid as preferred, the molar ratio of the divalent metal to the phosphorus atoms in the orthophosphoric acid preferably is at least, with increasing preference in the order given, 1.0:5.0, 1.0:4.0, 1.0:3.5, 1.0:3.0, 1.0:2.8, 1.0:2.6, 1.0:2.4, 1.0:2.3, 1.0:2.2, 1.0:2.1, or 1.0:2.05 and independently preferably is not more than 1.0:0.5, 1.0:0.8, 1.0:1.0, 1.0:1.2, 1.0:1.4, 1.0:1.6, 1.0:1.7, 1.0:1.8, 1.0:1.9, or 1.0:1.95.

Independently, at the time of mixing of a metal oxide and/or hydroxide with aqueous phosphoric acid to form an aqueous liquid post-treating composition according to the invention, the concentrations of the phosphoric acid and divalent metal oxides and/or hydroxides are preferably such that the concentration of the corresponding metal monohydrogen, dihydrogen, or non-hydrogen-containing phosphate salt or salts is at least, with increasing preference in the order given, 1, 3, 5.0, 6.0, 7.0, 8.0, 8.5, 9.0, 9.3, 9.5, 9.7, or 9.9% and independently preferably is not more than, with increasing preference in the order given, 80, 65, 50, 40, 35, 30, 25, 20, 17, 15, 13, 12.0, 11.5, 11.0, 10.7, 10.5, 10.3, or 10.1%. A solution prepared in this way serves as an excellent concentrate composition according to the invention. In a working composition according to the invention, however, the concentration of dissolved metal monohydrogen, dihydrogen, or non-hydrogen-containing phosphate salt or salts preferably is not more than, with increasing preference in the order given, 50, 40, 30, 20, 17, 15, 13, 12, 11, or 10.5% of the preferred concentration of the same constituents at the time of mixing of aqueous phosphoric acid and metal oxide and/or hydroxide. Independently, primarily for reasons of economy, in a working composition according to the invention the concentration of dissolved metal monohydrogen, dihydrogen, or non-hydrogen-containing phosphate salt or salts preferably is at least, with increasing preference in the order given, 1, 3, 5, 6.0, 7.0, 7.5, 8.0, 8.5, 9.0, 9.3, 9.5. 9.7, or 9.9% of the preferred concentration of the same constituents at the time of mixing of aqueous phosphoric acid and metal oxide and/or hydroxide to form a concentrate composition according to the invention.

The pH of a working hydrophilicizing composition according to this invention preferably is at least, with increasing preference in the order given, 2.0, 2.5, 3.0, 3.5, 4.0, 4.5, 5.0, 5.2, or 5.4 and independently preferably is not more than, with increasing preference in the order given, 8.0, 7.5, 7.0, 6.5, 6.0, 5.8, 5.6, or 5.5. The pH may be adjusted by slightly varying the amounts of metal oxide or hydroxide mixed with phosphoric acid to make a preferred type of composition according to the invention, or by other means known in the art.

The technically satisfactory embodiments of the invention that do not include any use of phosphate ions are substantially more expensive than the most preferred compositions, and are generally less preferred for that reason. In addition some of these less preferred alternatives give good hydrophilicity only under limited conditions, as discussed below in connection with the examples. If a polyalkyleneimine polymer is used, it preferably is a polyethyleneimine polymer.

A process according to the invention preferably produces a surface on which the advancing contact angle of deionized or other at least equally purified water in air is not more than, with increasing preference in the order given, 45, 40, 35, 32, or 29 degrees.

For best results, a hydrophilicizing process according to the invention should be applied promptly after the chromate conversion coating to be hydrophilicized has been formed. More specifically, the time interval between the end of formation of the chromate conversion coating, including any time of rinsing the initially formed coating with water, and the beginning of hydrophilicizing treatment according to the invention preferably is not more than, with increasing preference in the order given, 600, 300, 200, 150, 100, 90, 80, 70, 60, 50, 40, 35, 30, 25, 20, or 15 seconds. Independently, it is preferred that no deliberate drying of the chromate conversion coating, other than that which occurs inherently during any interval of dwell in ambient air between the formation of this conversion coating and the beginning of hydrophilicizing treatment as described above, and no other heating of the chromate conversion coated surface, be allowed to occur between the formation of the chromate conversion coating and beginning a hydrophilicizing treatment according to this invention.

Independently of other preferences, the increase in mass per unit area treated in a hydrophilicizing process according to the invention preferably is at least, with increasing preference in the order given, 0.1, 0.30, 0.40, 0.45, 0.50, 0.55, 0.60, 0.65, 0.70, or 0.74 grams per square meter (hereinafter usually abbreviated as "$g/m^2$") and independently preferably is, primarily for reasons of economy, not more than, with increasing preference in the order given, 10, 5, 4.0, 3.0, 2.5, 2.0, 1.7, 1.4, 1.2, 1.0, or 0.8 $g/m^2$.

For various reasons it is often preferred that compositions according to the invention as defined above should be substantially free from many ingredients used in compositions for similar purposes in the prior art. Specifically, it may be increasingly preferred in the order given, independently for each preferably minimized component listed below, that these compositions, when directly contacted with metal in a process according to this invention, contain no more than 1.0, 0.35, 0.10, 0.08, 0.04, 0.02, 0.01, or 0.001% of each of the following constituents: ferricyanide, ferrocyanide, nitrate and other oxidizing agents (the others being measured as their oxidizing stoichiometric equivalent as nitrate), organic liquids with a boiling point below 120° C., organic compounds containing amino and/or amido groups, undissolved dispersed silica, and dissolved or dispersed silicates.

The aluminum or aluminum alloy substrates to be treated according to this invention should first be provided with a conventional chromium containing conversion coating treatment of the type generally known in the art as "chromium oxide" treatments. These are illustrated, without limitation, by U.S. Pat. No. 4,146,410. While any treatment that effectively provides a chromium oxide conversion coating may be used to form the base substrate that is hydrophilicized by a process according to this invention, preferred chromium oxide conversion coating forming liquid compositions comprise, preferably consist essentially of, or more preferably consist of, water and:

(A) $CrO_3$ in a concentration that is at least, with increasing preference in the order given, 0.6, 0.8, 1.0, 1.3, 1.5, 1.7, 1.8, or 1.85 grams per liter (hereinafter usually abbreviated as "g/L") and independently preferably is not more than, with increasing preference in the order given, 10, 7.0, 5.0, 4.0, 3.5, 3.0, 2.6, 2.2, 2.0, or 1.90 g/L; and (B) sufficient strong acid to provide at least, with increasing preference in the order given, 0.5, 1.0, 1.4, 1.8, 2.1, 2.4, 2.7, 3.0, 3.3, or 3.5 points of free acid[1] and independently, primarily for reasons of economy, preferably not more than, with increasing preference in the order given, 100, 50, 25, 15, 10, 7.0, 5.0, 4.5, 4.2, 3.9, or 3.7 points of free acid; and, optionally and preferably, one or both, more preferably both, of the following constituents:

[1]"Points" of free acid are defined for use herein as the number of milliliters of 0.1 N aqueous solution of a strong alkali such as sodium hydroxide required to titrate a 10 milliliter sample of the composition to an end point with bromocresol blue indicator, or some other indicator of reaching a pH value of at least 5.5.

(C) simple or complex fluoride ions in a total concentration, measured as its stoichiometric equivalent as HF, of at least, with increasing preference in the order given, 0.10, 0.20, 0.25, 0.30, 0.35, 0.40, 0.45, 0.48, 0.51, or 0.53 g/L and independently preferably is not more than, with increasing preference in the order given, 7, 5, 4, 3.0, 2.5, 2.0, 1.5, 1.0, 0.90, 0.80, 0.70, 0.65, 0.61, 0.58, or 0.55 g/L; and (D) a component selected from the group of tungstate and molybdate ions in a concentration, measured as its stoichiometric equivalent as $Na_2WO_4.2H_2O$ with any molybdenum present being counted as the same number of tungsten atoms to determine the stoichiometric equivalent, that is at least, with increasing preference in the order given, 0.05, 0.10, 0.15, 0.20, 0.25, 0.30, 0.35, 0.38, or 0.41 g/L and independently, primarily for reasons of economy, preferably is not more than, with increasing preference in the order given, 7, 5, 3.0, 2.0, 1.4, 0.90, 0.80, 0.70, 0.60, 0.50, 0.46, or 0.43 g/L; and, optionally but not necessarily preferably, one or more of the following constituents:

(E) chromium(III) cations;

(F) a reducing agent in an amount sufficient to reduce some but not all of the chromium added as component (A) to provide chromium(III) cations; and (G) a component of compounds of one or more of boron, silicon, titanium, and zirconium that react with hydrofluoric acid to form complex fluoride anions.

It is normally preferred that component (A) be supplied by addition of $CrO_3$ itself, but the stoichiometric equivalent amount of hexavalent chromium can also be supplied by chromate and dichromate salts. Up to 60% of the chromium atom content can be reduced to chromium(III) if desired, by addition of component (F). If such a mixed Cr(III) and Cr(VI) conversion coating solution is used, the stoichiometric equivalent as $CrO_3$ of all chromium atoms present in the composition should be considered as forming part of the numerical values specified as preferred for component (A). Preferably, primarily for reasons of economy, with increasing preference in the order given, not more than 50, 40, 30, 20, 10, or 5% of the chromium atoms present in the composition are trivalent, with the remainder hexavalent.

Any acid with a larger ionization constant than that of hydrofluoric acid can be used for component (B), but nitric acid is generally preferred, inasmuch as sulfuric, phosphoric, and hydrochloric acids, the other relatively inexpensive strong acids, are at least mildly deleterious to the desired effectiveness of the chromate conversions coating compositions.

The presence of component (C) is generally highly preferred, and preferably at least, with increasing preference in the order given, 10, 20, 30, 40, 50, 60, 70, 80, or 90% of the total fluorine atoms present in component (C) are present as complex rather than simple fluoride ions. The complex fluoride ions may be obtained directly from additions of fluoboric, fluosilicic, fluotitanic, or fluozirconic acids and their salts, or, often more economically, by adding hydrofluoric acid and some other compound of one of the elements specified for optional component (G), such as boric acid, silica, or the like.

The presence of optional component (D) is generally highly preferred, inasmuch as the conversion coating forming process is usually undesirably slow when no material that satisfies the requirements for component (D) is present.

The use of component (E) when desired is well known in the art. Low molecular weight (and thus readily water-soluble) alcohols, saccharides, formaldehyde, and/or the like are generally used. No substantial advantage or disadvantage from using part of the chromium content of a composition according to the invention in trivalent rather than hexavalent form, within the preferred limits already given above, has been observed.

The mass per unit area of surface treated added-on by the conversion coating treatment preferably is at least, with increasing preference in the order given, 0.10, 0.30, 0.50, 0.70, 0.80, 0.90, 0.95, 1.00, or 1.05 $g/m^2$ and independently preferably is not more than, with increasing preference in the order given, 10, 7, 5.0, 4.0, 3.0, 2.0, 1.7, 1.5, 1.30, 1.20, 1.15, or 1.10 g/m² of surface treated. Before the conversion coating treatment, the surface(s) to be treated are preferably cleaned of any foreign matter and then rinsed, in one of the many ways known in the art to be effective.

The practice and benefits of the invention may be further appreciated by consideration of the following non-limiting working and comparison examples.

GENERAL CONDITIONS FOR THE EXAMPLES AND COMPARISON EXAMPLES

The surfaces treated were those on sample sheets (panels) of Type 3003 aluminum alloy. The processing sequence for all experiments included the following steps:

1. Acid cleaning by immersion of the sample sheets in a solution of 1.5% by volume of a concentrated acid cleaner formulation in water at 38° C. for 2.0 minutes.
2. Rinse twice, for 20 seconds each time, with cold tap water.
3. Chromate conversion coating by immersion in a 4% by weight solution in water of ALODINE® 713 Chromium Conversion Coating concentrate at 38° C. for 180 sec to produce an add-on mass of 1.0–1.1 g/m².
4. Rinse with cold tap water for 30 sec.
5. Hydrophilicizing treatment at 20–25° C. for 60 sec by immersion of the samples, producing a wet coating mass of about 0.75 g/m². (Initially, tests both with and without rinsing after this step were performed, but those with rinsing generally produced less hydrophilic surfaces, so that all the results shown below are for substrates processed without rinsing between this step and step 6.)
6. Allow to drain for 15 seconds in air. (If the surfaces to be treated have complicated shapes, so that they do not drain well, mechanical shaking, centrifugation, or the like is advantageous during the draining step.)
7. Oven dry at 120° C. for 15 minutes.

ALODINE® 713 concentrate is commercially available from the Parker Amchem Div. ("PAM") of Henkel Corp., Madison Heights, Mich., U.S.A. and is an example of a concentrate for a chromium oxide type conversion coating treatment. Prior art conventional hydrophilicizing treatments are exemplified by PALENE® 210 concentrates, available from Nihon Parkerizing Company, Ltd., Tokyo, Japan and/or PAM.

Other hydrophilicizing treatment compositions identified below as solutions of phosphate salts were in fact made by dissolving the corresponding metal oxide or hydroxide in aqueous orthophosphoric acid to neutralize part of the acid and produce a concentration of 10% stoichiometric equivalent as the salt shown in the identification as the only deliberately added ingredients in a concentrate, which was then diluted with additional water to form a working composition. Other treatment compositions identified below as solutions of specific chemicals were made by dissolving the actual chemical shown in the identifications.

The advancing contact angle of deionized water against the surface prepared by the treatments described above was determined by use of a Rame-Hart Model 100-00 NRL Contact Goniometer at a time 24 to 48 hours after the completion of the hydrophilicizing treatment and cooling of the treated substrate surface and also after (i) these surfaces had been immersed in flowing deionized water, displaced at a rate of 10% by volume of the total volume of the overflowable container in which the samples were immersed per minute, for 100 hours at ambient temperature, then dried for 2 hours in ambient air after removal from the container of flowing deionized water or (ii) the surfaces had been exposed for 168 hours to water vapor saturated air (i.e., 100% relative humidity) at 38° C., then rinsed with water and dried for 2 hours at ambient temperature.

Treating compositions and results with them are shown in Table 1 below. The results in Table 1 indicate that sulfate and molybdate salts are effective hydrophilicizing treatments over chromium oxide convention coatings, but only if they are used together with polyalkyleneimine polymer. Tungstate and sodium phosphate give good hydrophilicity alone, but only after immersion in water or exposure to humid air. However, tungstate is far more expensive than either type of phosphate, and magnesium phosphate gives good hydrophilicity immediately as well as after exposure to water or water vapor. Therefore, magnesium phosphate is most preferred.

TABLE 1

| Aqueous Solution Tested for Hydrophilicizing Effect | Contact Angle in Degrees After: | | |
|---|---|---|---|
| | Treatment | + Immer. | + Humid. |
| 1.0% Na$_2$WO$_4$.2H$_2$O | 45 | 11 | 25 |
| 1.0% Na$_2$WO$_4$.2H$_2$O + 1% POLYMIN ™ P | 33 | 10 | 46 |
| 1.0% Na$_2$MoO$_4$.3H$_2$O | 55 | 30 | 33 |
| 1.0% Na$_2$MoO$_4$.3H$_2$O + 1% POLYMIN ™ P | 19 | 10 | 50 |
| 1.0% Mg(H$_2$PO$_4$)$_2$, pH 5.3 | 10 | 15 | 29 |
| 1.0% NaH$_2$PO$_4$, pH 5.3 | 55 | 9 | 25 |
| 1.0% MgSO$_4$, pH 5.3 | 37 | 39 | 34 |
| 1.0% MgSO$_4$ + 1% POLYMIN ™ P | 28 | 18 | 30 |
| 0.5% MoO$_3$ + NH$_4$OH[1] + 1% POLYMIN ™ P | 22 | 9 | 22 |
| No treatment | 64 | 45 | 56 |
| PALENE ® 210 hydrophilicizing treatment composition | 40 | 21 | 30 |

Abbreviations, General Notes, and Footnote for Table 1
Immer. = Immersion; Humid. = Humidity Exposure; POLYMIN ™ P is a commercial product of BASF Corp. and is reported by its supplier to contain 49% of polyethyleneimine with an average molecular weight of about 70,000, 1% of polyethyleneimine hydrochloride, and the balance water.
[1]The amount of aqueous ammonia added was just sufficient to clarify a suspension of the previously added MoO$_3$.

The invention claimed is:

1. A process for increasing the hydrophilicity of a surface of a chromium oxide conversion coating on a metal substrate that contains at least 75% of aluminum, said process comprising steps of:
   (I) forming on said surface a liquid layer of a hydrophilicizing aqueous solution comprising water and at least one of:
      (i) a product or products of reaction between dissolved phosphoric acid and at least one of elemental metal, metal oxides, and metal hydroxides in contact therewith;
      (ii) tungstate ions; and
      (iii) at least one of sulfate or molybdate ions together with polyethyleneimine, said hydrophilicizing aqueous solution not comprising more than 0.10% of dissolved or dispersed silicates; and
   (II) drying into place on the surface the liquid layer formed in step (I), so as to form with the chromium oxide conversion coating an adherent solid hydrophilic coating over the metal substrate.

2. A process according to claim 1, wherein said hydrophilicizing aqueous solution comprises from about 0.3 to about 8.0% of a dissolved product of reaction between (1) a number of moles, measured as its stoichiometric equivalent as phosphorus atoms, of phosphoric acid and (2) a total number of moles, measured as its stoichiometric equivalent as metal atoms, of material selected from the group consisting of (2.1) hydroxides of metals and (2.2) oxides of metals, in amounts of reagents (1) and (2) such that the total number of moles of reagent (2) has a ratio to the number of moles of phosphorus atoms of reagent (1) that is in a range from about 1.0:5.0 to about 1.0:0.5.

3. A process according to claim 2, wherein said hydrophilicizing aqueous solution comprises from about 0.6 to about 4.0% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2) such that the total number of moles of reagent (2) has a ratio to the number of moles of phosphorus atoms of reagent (1) that is in a range from about 1.0:3.5 to about 1.0:1.0.

4. A process according to claim 3, wherein said hydrophilicizing aqueous solution has a pH from about 5.0 to about 5.5 and comprises from about 0.8 to about 1.2% of a product of reaction between (1) a number of moles, measured as its stoichiometric equivalent as phosphorus atoms, of phosphoric acid and (2) a total number of moles, measured as its stoichiometric equivalent as magnesium atoms, of material selected from the group consisting of (2.1) magnesium hydroxide and (2.2) magnesium oxide, in amounts of reagents (1) and (2) such that the total number of moles of reagent (2) has a ratio to the number of moles of phosphorus atoms of reagent (1) that is in a range from about 1.0:2.2 to about 1.0:1.8.

5. A process according to claim 4, wherein:
step (I) is begun not more than about 30 seconds after said chromium oxide conversion coating has been formed on said metal substrate and before said chromium oxide conversion coating has ever dried since it was formed;
said chromium oxide conversion coating has a dry mass per unit area from about 0.70 to about 1.30 g/m$^2$;
the liquid layer formed in step (I) contains from about 0.50 to about 1.7 g/m$^2$ of material that remains in place on the surface after drying; and
deionized water has an advancing contact angle that is not more than 35° on the surface formed after step (II) has been completed.

6. A process according to claim 3, wherein:
step (I) is begun before said chromium oxide conversion coating has ever dried since it was formed;
said chromium oxide conversion coating has a dry mass per unit area from about 0.30 to about 5.0 g/m$^2$;
the liquid layer formed in step (I) contains from about 0.30 to about 4.0 g/m$^2$ of material that remains in place on the surface after drying; and
deionized water has an advancing contact angle that is not more than 45° on the surface formed after step (II) has been completed.

7. A process according to claim 2, wherein:
step (I) is begun before said chromium oxide conversion coating has ever dried since it was formed; and
deionized water has an advancing contact angle that is not more than 45° on the surface formed after step (II) has been completed.

8. A process according to claim 1, wherein:
step (I) is begun before said chromium oxide conversion coating has ever dried since it was formed; and
deionized water has an advancing contact angle that is not more than 45° on the surface formed after step (II) has been completed.

9. A concentrated aqueous liquid composition of matter, suitable for dilution with water to form an aqueous solution that, when applied as a layer over a surface of a chromium oxide conversion coating and dried into place thereover, will form a surface on which deionized water has a smaller advancing contact angle than it has on the surface of the chromium oxide conversion coating, said composition consisting essentially of water and from about 5.0 to about 40% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2) such that the total number of moles of reagent (2) has a ratio to the number of moles of phosphorus atoms of reagent (1) that is in a range from about 1.0:3.5 to about 1.0:1.0.

10. A concentrated aqueous liquid composition of matter according to claim 9, said composition consisting essentially of water and from about 6.0 to about 30% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2) such that the total number of moles of reagent (2) has a ratio to the number of moles of phosphorus atoms of reagent (1) that is in a range from about 1.0:2.6 to about 1.0:1.6.

11. A concentrated aqueous liquid composition of matter according to claim 10, said composition consisting essentially of water and from about 8.5 to about 11.0% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2) such that the total number of moles of reagent (2) has a ratio to the number of moles of phosphorus atoms of reagent (1) that is in a range from about 1.0:2.2 to about 1.0:1.9.

12. A concentrated aqueous liquid composition of matter according to claim 11, wherein reagent (2) is magnesium oxide or magnesium hydroxide.

13. A concentrated aqueous liquid composition of matter according to claim 10, wherein reagent (2) is magnesium oxide or magnesium hydroxide.

14. A concentrated aqueous liquid composition of matter according to claim 9, wherein reagent (2) is magnesium oxide or magnesium hydroxide.

15. An aqueous liquid composition of matter that has a pH from about 2.5 to about 8.0 and, when applied as a layer over a surface of a chromium oxide conversion coating and dried into place thereover, will form a surface on which deionized water has a smaller advancing contact angle than it has on the surface of the chromium oxide conversion coating, said composition consisting essentially of water and from about 5.0 to about 40% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2)

such that the total number of moles of reagent (2) has a ratio to the number of moles of phosphorus atoms of reagent (1) that is in a range from about 1.0:3.5 to about 1.0:1.0.

16. An aqueous liquid composition of matter according to claim 15, said composition having a pH from about 3.5 to about 7.0 and consisting essentially of water and from about 6.0 to about 30% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2) such that the total number of moles of reagent (2) has a ratio to the number of moles of phosphorus atoms of reagent (1) that is in a range from about 1.0:2.6 to about 1.0:1.6.

17. An aqueous liquid composition of matter according to claim 16, said composition having a pH from about 4.5 to about 5.5 and consisting essentially of water and from about 8.5 to about 11.0% of a product of reaction between (1) a number of moles, measured as its stoichiometric equivalent as phosphorus atoms, of phosphoric acid and (2) a total number of moles, measured as its stoichiometric equivalent as divalent metal atoms, of material selected from the group consisting of (2.1) hydroxides of divalent metals and (2.2) oxides of divalent metals, in amounts of reagents (1) and (2) such that the total number of moles of reagent (2) has a ratio to the number of moles of phosphorus atoms of reagent (1) that is in a range from about 1.0:2.2 to about 1.0:1.9.

18. An aqueous liquid composition of matter according to claim 17, wherein reagent (2) is magnesium oxide or magnesium hydroxide.

19. An aqueous liquid composition of matter according to claim 16, wherein reagent (2) is magnesium oxide or magnesium hydroxide.

20. An aqueous liquid composition of matter according to claim 15, wherein reagent (2) is magnesium oxide or magnesium hydroxide.

* * * * *